United States Patent
Cymbalski

[19]

[11] Patent Number: 5,867,595
[45] Date of Patent: Feb. 2, 1999

[54] RECOGNIZING DATAFORMS IN IMAGE AREAS

[75] Inventor: Robert Stanley Cymbalski, Fort Myers, Fla.

[73] Assignee: Metanetics Corporation, Akron, Ohio

[21] Appl. No.: 742,369

[22] Filed: Nov. 1, 1996

Related U.S. Application Data

[62] Division of Ser. No. 259,897, Jun. 15, 1994.

[51] Int. Cl.$^6$ ....................................................... G06K 9/00
[52] U.S. Cl. ............................................................. 382/192
[58] Field of Search ............................ 358/515; 382/162, 382/164, 165, 166, 167, 181, 182, 183, 184, 185, 187; 235/462, 494

[56] References Cited

U.S. PATENT DOCUMENTS

| | | | |
|---|---|---|---|
| 4,998,010 | 3/1991 | Chandler et al. | 235/494 |
| 5,134,272 | 7/1992 | Tsuchiya et al. | 235/462 |
| 5,155,343 | 10/1992 | Chandler et al. | 235/462 |
| 5,268,580 | 12/1993 | He | 235/462 |
| 5,304,787 | 4/1994 | Wang | 235/462 |
| 5,311,001 | 5/1994 | Joseph et al. | 235/462 |
| 5,373,147 | 12/1994 | Noda | 235/462 |
| 5,396,054 | 3/1995 | Krichever et al. | 235/462 |

*Primary Examiner*—Jose L. Couso
*Attorney, Agent, or Firm*—Benesch, Friedlander, Coplan & Aronoff LLP

[57] ABSTRACT

Dataforms, such as bar codes and matrix codes, are recognized by analysis of histogram type data derived for a plurality of window sections of an image area. Typically, an image area 512 pixels high by 480 pixels wide is divided into 240 window areas, each including 1024 pixels in a 32 by 32 pixel square. A histogram for a window section overlying a portion of the dataform may typically exhibit two peaks representing the two principal reflective values (black and white, for example) of the elements and spaces of a dataform. A background (quiet zone) window section histogram exhibits one principal peak representing the background value (white, for example). The background window sections and the dataform window sections are assigned to two different groups. One or both groups are then used for one or more of the following: recognizing the presence of a dataform; determining whether the dataform is darker or lighter than the background; and locating the dataform within the image area. Also, a single histogram is used to identify the type of dataform, based upon the histogram signature of the dataform.

7 Claims, 7 Drawing Sheets

RECOGNIZING DATAFORMS IN IMAGE AREAS

This application is a division of application Ser. No. 08/259,897, filed Jun. 15, 1994, and copending herewith.

This invention relates to recognizing dataforms, such as bar codes and matrix codes, which may be present in an image area. More particularly, the invention relates to recognizing one or more of (i) the presence of a dataform, (ii) whether the dataform elements are darker or lighter than a background area, (iii) the location of a dataform in an image area, and (iv) the type of dataform.

BACKGROUND OF THE INVENTION

The application and use of bar codes and matrix codes are well known and growing. Bar codes and matrix codes are forms of "dataforms", which for present purposes are defined to include all arrangements whereby data is fixed in some form of machine readable copy. Thus, dataforms include one and two dimensional bar codes, matrix codes and graphic codes, as well as words and numbers and other symbols, which may be printed or etched on paper, plastic cards and metallic and other items. Dataforms may be printed in invisible ink, magnetically recorded via magnetic stripes or magnetic ink fonts, electromagnetically recorded via RF tags, engraved, stamped, tattooed (on skin), formed by ion doping (for semiconductor wafers) or biochemical binding, etc.

In the utilization of dataforms, data originally encoded is recovered for further use in a variety of ways. For example, a printed bar code may be optically scanned to derive reflectance values which are digitized, stored in buffer memory and subsequently decoded to recover the data encoded in the bar code. Regardless of the particular type of dataform, an image is typically acquired and stored as pixel values for further processing. An image of a bar code or matrix code existing as a graphic image can be acquired by use of a CCD scanner, a laser scanner, a CMOS camera, or other suitable device which is capable of distinguishing between different reflective values of light reflected from a dataform. Thus, for example, a bar code typically comprises black or dark colored bar type elements printed on a white or light colored background area, with white or light colored spaces between the elements of the bar code. The spaces are typically the same color as the background area, but may be of a different light color in this example. In other examples the elements of a bar code or matrix code are white or light colored and are defined by black or darker colored spaces and background area. With either arrangement, the relevant background area is typically a "quiet zone" or single color area immediately surrounding the dataform. This background area or quiet zone may be bordered by areas of multiple colors, patterns, text, etc.

For the example of black elements with white spaces and background area, pixel values of low reflective value will be representative of the elements and pixel values of high reflective value will be representative of the spaces and background area. In other applications, such as laser engraving on silicon wafers, illumination may result in a dark on light relationship in one orientation and a light on dark relationship in a different orientation, In addition to pixel values representing reflective values of light ("light" being defined as encompassing the entire electromagnetic spectrum for present purposes), in other arrangements pixel values representative of reflective values may be based upon reflection of sound waves or other mediums from a dataform of an appropriate configuration. In any such arrangement in which a dataform is arranged to be read on the basis of reflective values, such reflective values may typically be stored as pixel values in an image buffer memory or other storage medium in bit map or other form which, while representative of pixel values for an image, may utilize any appropriate data storage format.

In many applications of dataforms, such as discussed above, successful reading of a dataform is dependent upon one or more of the following (i) recognizing the presence of a dataform (ii) determining whether the dataform is dark on a light background area or light on a dark background area, and (iii) determining the actual location of the dataform within an image area. These typically do not present difficult problems where a laser scanner is to be manually pointed at a dataform printed in black on a white background area, for example. However, where a dataform is printed in "invisible" ink for use with light outside the visible spectrum or is otherwise not visible, or where dataforms which may be randomly positioned on objects are to be read on an automated, unattended basis, for example, considerations such as recognizing the presence, dark/light color and location of a dataform can be very important. Even in manual operation, capabilities such as dataform location recognition may be important in allowing operation with greater speed, by lower skilled employees, etc.

It is therefore an object of this invention to provide new and improved dataform recognition methods and systems, and such methods and systems which enable one or more of:

(i) recognition of the presence of a dataform which may be present in an image area, (ii) determination of whether elements of a dataform appear dark or light on a contrasting background area, (iii) determination of the location of the dataform within an image area, and (iv) identification of the type of dataform present within an image area.

SUMMARY OF THE INVENTION

In accordance with the invention, a method of recognizing a dataform (including elements and spaces having different reflective values) which may be present in an image area including a background area having primarily a single reflective value distinct from the reflective value of the elements, includes the following steps:

(a) sampling pixel values, each representative of a reflective value of an incremental part of a first window section of the image area which may include a portion of a dataform, to derive data indicative of relative levels of occurrence of pixel values representative of the presence of different reflective values within the window section;

(b) categorizing the window section in one of the following groups (i) a first group for which the derived data indicates the presence of at least two principal reflective values (a relatively higher value and a relatively lower value), (ii) a second group for which the derived data indicates the presence of one principal reflective value (representative of the background area) and (iii) a third group for other window sections;

(c) repeating steps (a) and (b) for a plurality of additional window sections of the image area;

(d) utilizing at least one of such first and second groups of window sections (with the derived data as relevant) for carrying out at least one of the following steps:

(x) recognizing the presence of the dataform in the image, based upon the presence of such first group of window sections characterized by at least two principal reflective values;

(y) determining whether the elements of the dataform have a reflective value higher or lower than the distinct background area reflective value, based upon analysis of which of the relatively higher and lower values of such first group of window sections is most distinct from the one principal reflective value of such second group (which is representative of the background area); and (z) determining the location of the dataform, based upon analysis of at least one of: the composite positions of window sections of such first group (which represent portions of the dataform), and a frame effect provided by the composite positions of window sections of such second group (which represent the background area).

Also in accordance with the invention, a system for recognizing a dataform (including elements and spaces having at least two different reflective values) positioned on a background area primarily characterized by a single reflective value, includes the following. A storage unit is arranged to store pixel data including a plurality of pixel values each representative of a reflective value of an incremental part of one window section of a plurality of window sections of an image area which may include a dataform. Each such window section comprises a portion of the image area large enough to be able to encompass at least portions of a plurality of the elements of the dataform. A sampling unit is arranged to sample the pixel data for each of a plurality of window sections to derive a form of histogram data for individual ones of the window sections. Such data is indicative of the relative levels of occurrence of pixel values representative of different reflective values in an individual window section. An analysis unit is arranged to analyze the derived data to identify at least one of (i) a first group of window sections for which such derived data is indicative of at least two principal reflective values and (ii) a second group of window sections for which such derived data is indicative of one principal reflective value (corresponding to the background area).

The system further includes an interpretation unit which is arranged to utilize at least one of such first and second groups of window sections (with relevant portions of the derived data) for at least one of the following: (i) recognizing the presence of a dataform; (ii) determining whether the reflective value of the dataform elements is higher or lower than the single reflective value corresponding to the background area; and (iii) locating the dataform relative to the image area, based upon the composite positions of a group of the window sections.

Further in accordance with the invention, a method of recognizing a dataform including elements and spaces having different reflective values includes the following steps:

(a) sampling pixel values, each representative of a reflective value of an incremental part of an image area including at least a portion of the dataform, to derive data indicative of relative levels of occurrence of pixel values representative of the presence of different reflective values;

(b) comparing the derived data to reference data representative of at least one type of dataform; and (c) providing an output indication of correspondence between the derived data and the reference data.

For a better understanding of the invention, together with other and further objects, reference is made to the accompanying drawings and the scope of the invention will be pointed out in the accompanying claims.

DESCRIPTION OF THE INVENTION

Figure 1:
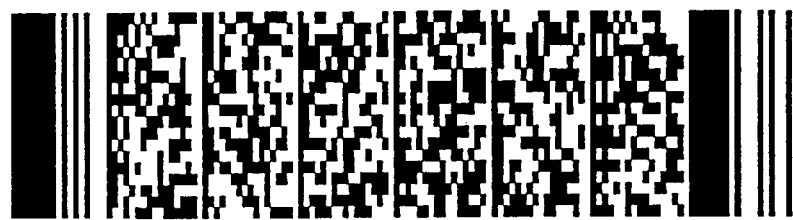
FIG. 1 shows a form of two-dimensional bar code (magnified two times to show details).
Figure 2:
FIG. 2 shows a form of matrix code (magnified two times to show details).
Figure 3:
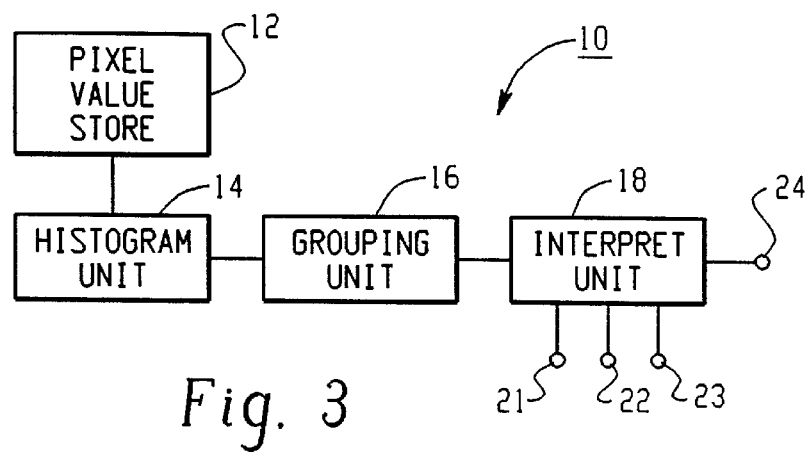
FIG. 3 is a block diagram of a system for recognizing a dataform in accordance with the invention.

FIGS. 1 and 2 show typical prior art forms of a two-dimensional bar code and a matrix code respectively. FIG. 3 shows a simplified block diagram of one form of a system 10 for recognizing a dataform (as previously defined) in accordance with the invention. The FIG. 3 system is particularly adapted for recognizing any type of dataform which, regardless of its actual form or implementation, includes elements and spaces having at least two different reflective values which can, by any appropriate technique for reading the dataform, be represented by pixel values representative of the different reflective values of the elements and spaces. Initially, the discussion will focus on dataforms represented by two different reflective values and dataforms characterized by three or more such values will be addressed further below. For the examples of the bar code and matrix code dataforms of FIGS. 1 and 2, it will be seen that the elements (bars of FIG. 1 and squares of FIG. 2) are black and are separated by intermediate white spaces. Also, the background around the dataforms in FIGS. 1 and 2 is white. As is well known, in other embodiments the elements may be white and contrasted to black spaces and background, or other colors (e.g., reflections of electromagnetic energy at identifying frequencies) may be substituted for the black or white of FIGS. 1 and 2. However, for dataform readability the reflective values of the spaces and the quiet zone background area immediately surrounding the dataform are desirably distinct from the reflective value of the elements as represented by the respective pixel values, regardless of what method and medium are used in order to obtain such pixel values.

The system 10 illustrated in FIG. 3 includes a storage unit, shown as pixel value store 12, which is arranged to store pixel data including a plurality of pixel values each representative of a reflective value of an incremental part of one window section of an image area. Thus, with reference to FIG. 5 which illustrates one example, for an image area 50 including a matrix code dataform 52, horizontally spaced marks 54 and vertically spaced marks 56 represent divider markers for a grid effective to divide the image area 50 into a plurality of square window sections (240 in all in this example) which together represent the entire image area shown. In this example, the matrix code includes dark elements and light spaces and the background includes a light colored quiet zone surrounded by an arbitrary multicolor design. In accordance with the FIG. 5 example, an image area of 512 (height) by 480 (width) pixels is thus divided into 240 window sections of 32 by 32 pixels each. With this choice of window section dimensions relative to the dimensions of the entire image area, each window section comprises a portion of the image area which is large enough, to be able to encompass at least portions of a plurality of the elements of the dataform. The "to be able" terminology reflects the fact that a particular window section will actually encompass element portions only if that window section is one which overlies the location of a dataform, as compared to overlying a portion of the background only. As will be discussed further, this relative window section sizing serves to help ensure that a window section overlying a dataform will include a significant number of pixel values representative of the reflective value of the dataform elements, as well as a significant number of pixel values representative of the spaces between dataform elements. In other embodiments, each window section will typically encompass pixel values for at least 144 pixels and each such window section will typically represent an area not larger than the size of the dataform within the image area of interest. Typical embodiments use an image width of 256, 512, 768, 1024 or 2048 pixels. Window section widths are then typically selected from the set of numbers 8, 12, 16, 24, 48 and 64. Image height and window height are typically proportional to the width.

The FIG. 3 system also includes a sampling unit, shown as histogram unit 14, arranged to sample pixel values included in the pixel data stored in storage unit 12. Unit 14 samples the pixel values to derive data, separately for each individual window section, which is indicative of the relative levels of occurrence of pixel values representative of different reflective values in an individual window section. Such data may typically be derived in the form of histograms using the X coordinate for the color represented by a pixel value (e.g., black, white and other colors or frequencies in the electromagnetic spectrum) and the Y coordinate for a scale indicating the number of occurrences of each particular color as represented by pixel values within one window section. Thus, for example, if a window section overlies the bars and spaces of a portion of a black and white bar code, the histogram would indicate a large number of black pixel values and a large number of white pixel values (as well as some intermediate pixel values for pixels falling upon a transition line between a bar and a space). FIG. 6 comprises 240 histograms, each of which is positioned in a square corresponding to the window section for which it represents the pixel values of the FIG. 5 image area.

With reference to FIG. 6, a number of different examples of histograms are included. Histogram 60 is a typical example of data for a window section of a first group for which the derived data is indicative of two principal reflective values as shown by the two spaced apart data peaks representing significant numbers of black and white pixel values. As seen by comparing FIGS. 6 and 5, window section 60 overlies a portion of the bars and spaces of the bar code, so that a significant number of pixel values representative of the bars (black) and also a significant number of pixel values representative of the spaces (white) are present in this window section. Histograms 62 and 64 are typical examples of data for a second group of window sections for which the derived data is indicative of one principal reflective value. As seen with reference to FIG. 5, histogram 62 presents derived data indicative principally of a white window section and histogram 64 presents derived data indicative principally of a black window section of the FIG. 5 image area. Histogram 66, by contrast, is an example of data for a third group of other window sections (i.e., window sections for which the derived data is not indicative of either one or two principal reflective values). Thus, the third group may be indicative of window sections overlying areas containing various patterns, designs, text, etc. which are not part of the dataform, or of pixel values which are anomalous for some reason. In general, the third group of window sections will be ignored, although this grouping may be useful for purposes of overall image interpretation in some cases. The presence of one or more "principal reflective values" within a window section may be determined on an automated basis in a variety of ways by skilled individuals. For example, histogram type data may be subjected to a threshold type filtering process whereby reflective values represented by histogram peaks of amplitude exceeding an appropriately selected threshold amplitude are identified as principal reflective values for present purposes. It will be appreciated that each principal reflective value identified in this manner will be associated with a particular color or frequency along the X coordinate. Use of thresholds and other techniques in development of suitable histogram data representations are described further under the heading "OTHER EMBODIMENTS".

Referring again to FIG. 5, the dataform recognition system as illustrated further includes an analysis unit, shown as grouping unit 16, arranged to analyze the derived data provided by histogram unit 14 to identify at least one of:
  (i) a first group of window sections for which (as described above for this example) the derived data is indicative of two principal reflective values (i.e., window section 60 of FIG. 6); and
  (ii) a second group of window sections for which the derived data is indicative of one principal reflective value (i.e, window section 62, for example).

As will be understood in view of the preceding discussion, each window section of the first group comprises a portion of the image area which encompasses a portion of the dataform and each window section of the second group primarily overlies a portion of the background area of the image section which surrounds the dataform, e.g., the quiet zone.

Figure 7:
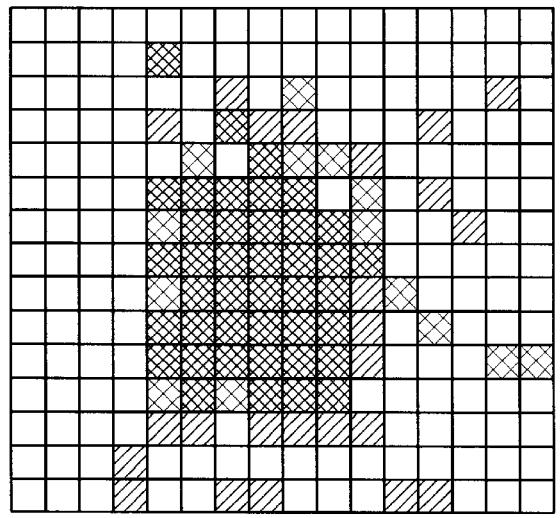
FIG. 7 shows a visual form of categorization of the FIG. 6 window sections.

Referring now to FIG. 7, there is illustrated one form of visual representation of the results of operation of the analysis unit illustrated as grouping unit 16 of FIG. 3. In FIG. 7, each window section of the first group identified by two principal reflective values, and thereby representing window sections overlying portions of the bar code, is shown with dark shading. Each of the second group window sections, representing portions of the background area, is shown white and each of the third group window sections is shown with light grey shading. By observing the composite positions of the group one dark shaded window sections (i.e., the relative positions of all the dark window sections combined) in FIG. 7, the presence and position of the bar code within the FIG. 5 image area is readily discernable on a visual basis. Alternatively, by observing the composite positions of the group two white window sections in FIG. 7, a frame effect is provided which independently identifies the dataform presence and position. When the invention is implemented on an automated basis, utilizing types of analytical and data processing techniques available to skilled persons, it will be appreciated that it will typically not be necessary to actually provide a visual representation as shown in FIG. 7, since the dataform recognition process will proceed electronically. However, in instances in which a visual representation is appropriate, a display or printout in a form such as shown in FIG. 7 may be provided.

System 10 of FIG. 3 additionally includes an interpretation unit, shown as interpret unit 18, arranged to utilize one or both of the first and second groups of window sections, with portions of the derived data as relevant, for one or more of the following:

(1) for recognizing the presence of a dataform, (2) for determining whether the dataform elements are lighter (higher reflective value) or darker (lower reflective value) than a background color (reflective value), and (3) for locating the dataform within the image area. With respect to item (1), the presence of a dataform can be recognized by the presence of the first group of window sections representing histograms exhibiting at least two reflective values, which the present inventor has discovered to particularly characterize the presence of a dataform. The presence of window sections in the second group can be used with the first group as confirmatory of the presence of a dataform surrounded by a background area. This "presence" information can be provided at output port 21 in FIG. 3.

As to item (2), determination of whether the dataform elements are light against a dark background area or dark against a light background area is based upon comparison of each of the two principal reflective values (colors) of window sections of the first group in this example, to the one principle reflective value of window sections of the second group which immediately border the dataform. Thus, in FIG. 7 it will be seen that the composite positions of the first group of window sections can be considered to provide a basic silhouette of the bar code and that adjacent window sections, such as window section 62, exhibit a principal reflective value which may be considered to be at the high (or light color) end of the histogram color/reflective value scale. The light background area is thus supportive of the conclusion that the dataform elements are of a darker color (lower reflective value) for purposes of contrast to enhance dataform reading accuracy. On a more general basis, the background area histogram (e.g., for window section 62) can be compared to a dataform histogram (e.g., window section 60) to enable confirmation of the conclusion that section 60 histogram does indicate that the dataform includes a principle reflective value (e.g., representing black) which is distinctive from the reflective value indicated by the background area histogram. Stated differently, the histogram type data derived for each of the first and second groups is analyzed to determine which of the relatively higher or lower values of the two reflective values of the first group of window sections (representing the dataform) is most distinct from the one principal reflective value of the second group of window sections (representing the background area). Thus, if the most distinct reflective value (color) of the dataform window sections is lighter than the background area reflective value (color), the dataform elements are light on a darker background area, and vice versa. This "darker/lighter" information can be provided at output port 22 in Fig.3.

For item (3) above, the location of the dataform within the overall image area is indicated by the silhouette of the dataform (as observable in FIG. 7) represented by the composite positions of the first group of window sections, as discussed above. It will be appreciated that the composite positions of the second group of background area window sections independently provide a frame effect around the dataform (as observable in FIG. 7), so as to also provide a dataform silhouette effect indicative of dataform position. Location may thus be determined by analysis of the composite positions of either the first or the second group of window sections, or both groups may be used on a combined or confirmatory basis. This "location" information can be provided at output port 23 in FIG. 3. Alternatively, any two or more of the three types (presence, darker/lighter and location) of dataform recognition information can be provided at output port 24 in FIG. 3.

With the benefit of the foregoing, it will be appreciated that availability of recognition information as to the (i) presence, (ii) relative reflective value and (iii) location of a dataform, or any one or more of these three items of information provided on an automated or other basis, can be utilized by persons skilled in the art in order to control or improve the operation, control, adjustment, etc., of bar code, matrix code and other dataform reading and sensing devices, systems and methods.

FIG. 4 FLOW CHART

Figure 4:
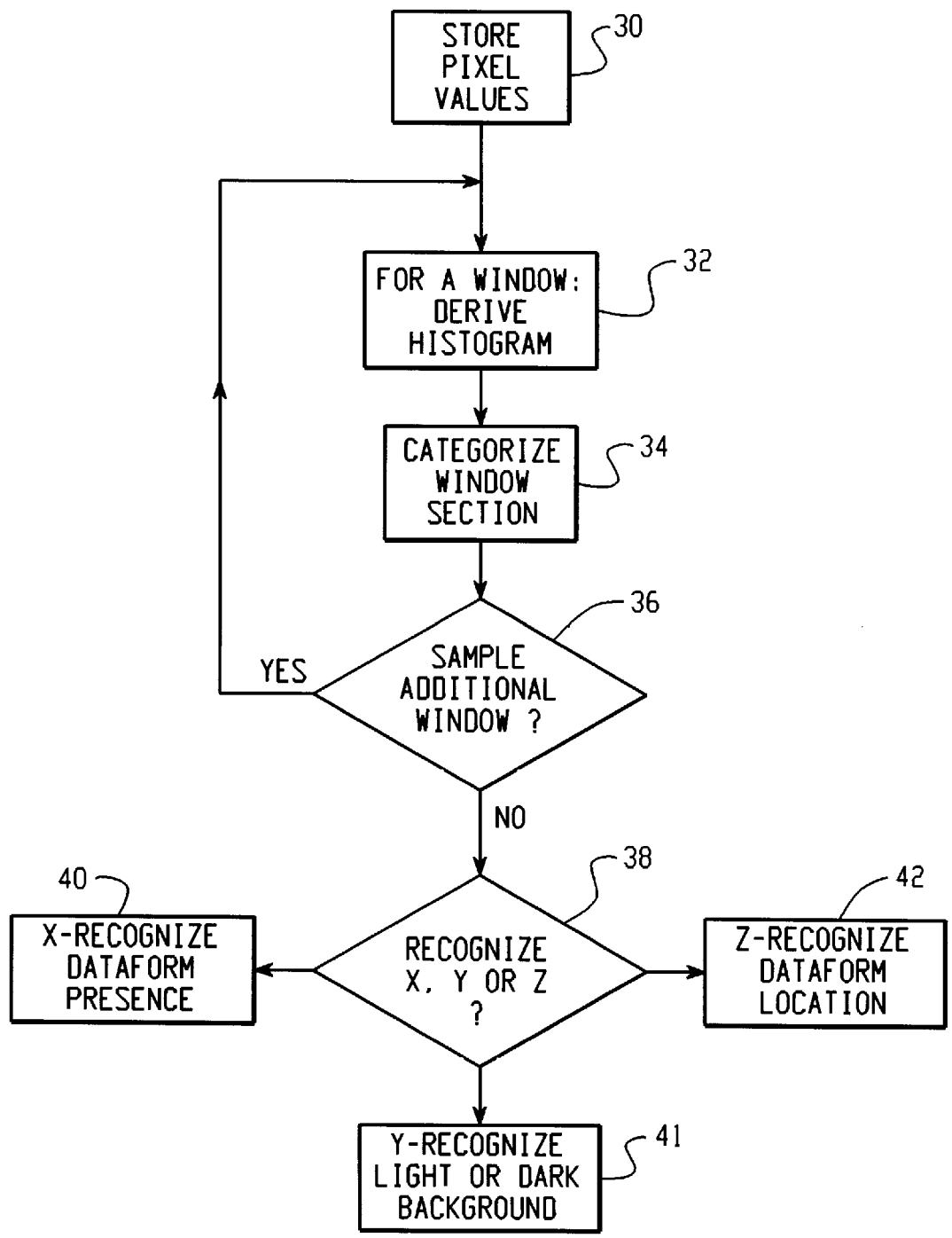
FIG. 4 is a flow chart depicting a method for recognizing a dataform in accordance with the invention.

Referring now to FIG. 4, there is illustrated a flow chart of a sequence of steps in a method of recognizing a dataform in accordance with the invention. The various steps may typically be carried out under the control of software programming utilized in operation of the system of FIG. 3. In step 30, pixel values derived in any appropriate manner as discussed above are stored in an accessible format. Desirably, the pixel values each represent a reflective value of an incremental part of an entire image area of interest, which may include a dataform, and are stored so as to be accessible for a plurality of individual window sections as described with reference to FIG. 5.

In step 32, pixel values for a first window section are sampled to derive data indicative of relative levels of occurrence of pixel values representative of the presence of different reflective values within the window section. While a variety of approaches may be employed to provide and retain this data on a computational basis, the histogram type presentations shown in FIG. 6 and described with reference thereto provide a viewable representation of the relevant characteristics of this data.

In step 34, the window section for which the histogram type data was derived in step 32 is categorized in one of the following groups.

(i) A first group is provided for window sections for which the derived data indicates the presence of at least two principal reflective values. It will be appreciated that regardless of whether a dataform, such as a matrix code, is presented in black and white, shades of grey, different engraved surface textures, or other implementation as discussed above, pixel values representative of two or more different reflective values can always be characterized as including a relatively higher value and a relatively lower value. Thus, the first group of window sections is categorized by histogram type derived data indicative of at least two principal reflective values, including a relatively higher value and a relatively lower value. As discussed above, the present inventor has discovered that these window sections are particularly representative of the presence of a portion of a dataform within such window sections. (In other embodiments which will be referred to below, this first group may be further categorized into sub-groups for window sections characterized by two, three, four, etc., principal reflective values.)

(ii) A second group is provided for window sections for which the derived data indicates the presence of one principal reflective value. As discussed, such derived histogram type data is particularly representative of a window section overlying a portion of a background area of primarily a single color or reflective value.

(iii) A third group is actually or conceptually provided for other window sections, i.e., window sections which are not categorized in either of the first or second groups.

Pursuant to step 36, of FIG. 4, steps 32 and 34 are repeated for a plurality of additional window sections of the image area, until all window sections of interest (e.g., each of the window sections of FIG. 5) have been categorized by appropriate group. After all window sections of interest have been categorized the method continues with step 38.

In step 38 at least one of the first and second groups of window sections (with derived data from step 32, as relevant) are utilized for carrying out one or more of the following steps, as determined to be appropriate in particular applications of the invention. These additional steps, the specifics of which have already been discussed with reference to the system of FIG. 3, comprise:

(x) recognizing the presence of a dataform in the image area (step 40), (y) determining whether the dataform elements have a reflective value darker or lighter than the background area (step 41), and (z) determining the location of the dataform within the image area (step 42).

Thus, with reference to FIG. 4, in operation the illustrated method can be arranged to proceed from step 38 to any one or more, or all, of steps 40–42.

With an understanding of the invention, it will be apparent that if, in a particular application, the object is merely to determine whether a dataform is on a dark or light background in order to facilitate operation of a bar code reader, the method need not include steps 40 or 42. Correspondingly, if in a particular application it is known in advance that all bar codes will be printed in black on a white background, but to facilitate operation of an automated bar code reader it is desired to know initially whether a bar code is present (or both presence and location) then only step 40 need be included (or only steps 40 and 42). If only location information is needed, a method including step 42, without steps 40 and 42, can be provided. Thus, since steps 40 and 42 are independently providable alone or in combination, methods and systems in accordance with the invention provide flexibility in permitting application-specific implementation.

OTHER EMBODIMENTS

Further to the above description of the invention, which particularly focused on use in the context of dataforms exhibiting two principal reflective values, additional features and capabilities of the invention should be addressed. Other dataforms may include elements having various representations, such as a black and grey symbol on a white background area, or dataforms including a plurality of shades of grey or three or more colors to define elements. For such applications histograms may be formed using the full resolution of the sensor (e.g., an eight bit digital sensor providing 256 possible values) or using only n most significant bits of information (e.g., only 6 bits of information providing 64 possible grey scale values). Also, in histogram preparation and representation, multiple colors in relative proximity may be grouped together to smooth or simplify the histogram curve. For example, if colors are represented by the numbers 0 to 255, the first grouping or bin might include colors 0, 1, 2 and 3, the next colors 4, 5, 6 and 7, etc.

This also relates to identification of histogram peaks representing principal reflective values during the preparation of histograms, as in the following example. First, a lower threshold can be selected, with recognition only of color peaks exceeding this "Peak Height Required" threshold. A threshold can also be selected for a peak width which will be used to eliminate closely spaced data not meeting a "Peak Width Used" threshold. The system can then search across the histogram for meaningful data items exceeding such thresholds. Upon identifying such a data item the system notes the color/grey-scale value and the peak height (i.e., the number of samples in that window at that color). As the search continues across the histogram, the color value of the next meaningful data item is compared to the last such data item. If not within the Peak Width Used parameter, the new data item is considered independent of previous peak items; if it is also a higher peak than the previous one (more data items fell at this color), the system keeps the new peak and eliminates the previous peak. By extension of this technique the largest two (or three or other selected number) of peaks contained within a particular histogram can be identified.

This approach is directly applicable to the categorizing of window sections into different groups based upon the number of principal reflective values. As previously discussed, window sections characterized by at least two principal reflective values may be categorized into a first group as representative of a dataform, while window sections characterized by one principal reflective value representative of a background area are placed in a second group. It should be recognized, however, one or more dataforms of many different forms and types may be present in an image area and such different forms and types of dataforms may be characterized by histogram characteristics such as three peaks, two peaks, two peaks at different amplitudes, three peaks at different spacings, etc. In view of this, in application of the invention the first group of window sections may be further broken down into sub-groups of the first group. Thus, all window sections in this first group would exhibit at least two principal reflective values, however one sub-group might be limited to two such values, another to three such values, another to two such values with particular relative peak values, etc. As a sub-set of this, when representing window sections conceptually or actually (as in FIG. 7) by different shades of grey as previously discussed, the shading may be implemented so that the darker the shading the higher the probability that the window section includes a portion of a dataform. Thus, the window sections can be scored on the basis of how different the two peak colors are. Then when performing image recognition, precedence is given to the window sections showing the best color separation.

In sampling pixel values of window sections, in some embodiments it will be preferable to sample multiple window sections "simultaneously" by scanning across an entire image line at one time, crossing adjacent window sections. This type of entire image scanning typically enables the fastest operation. However, scanning can also be performed on a window-by-window basis sequentially or on a random selection basis. Such scanning of selected window sections one-by-one in sequence enables development of histogram data only for selected windows, histogram preparation on-the-fly while the image is being read into memory, etc.

Figure 5:
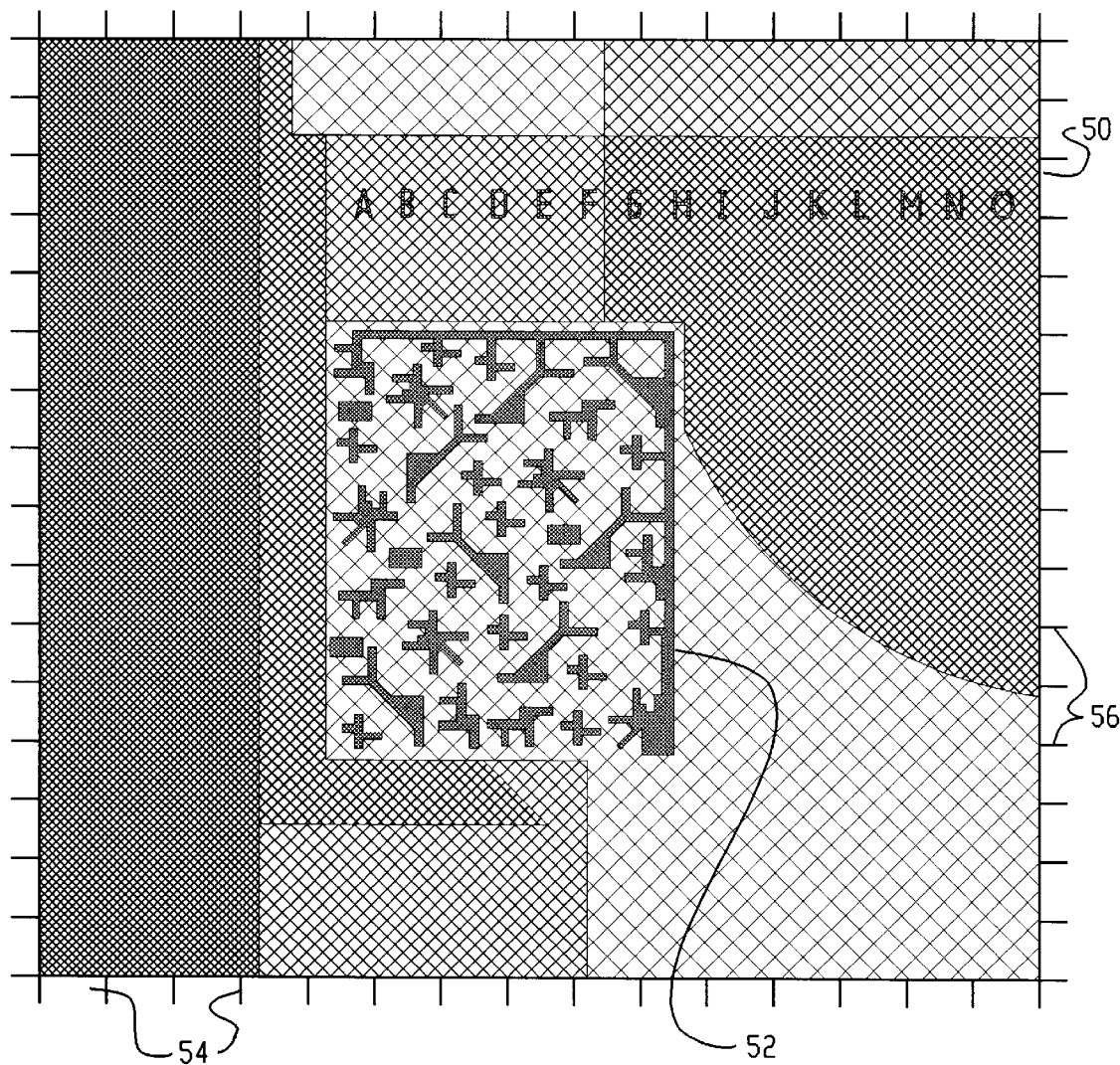
FIG. 5 is an example of an image area including a dataform.
Figure 6:
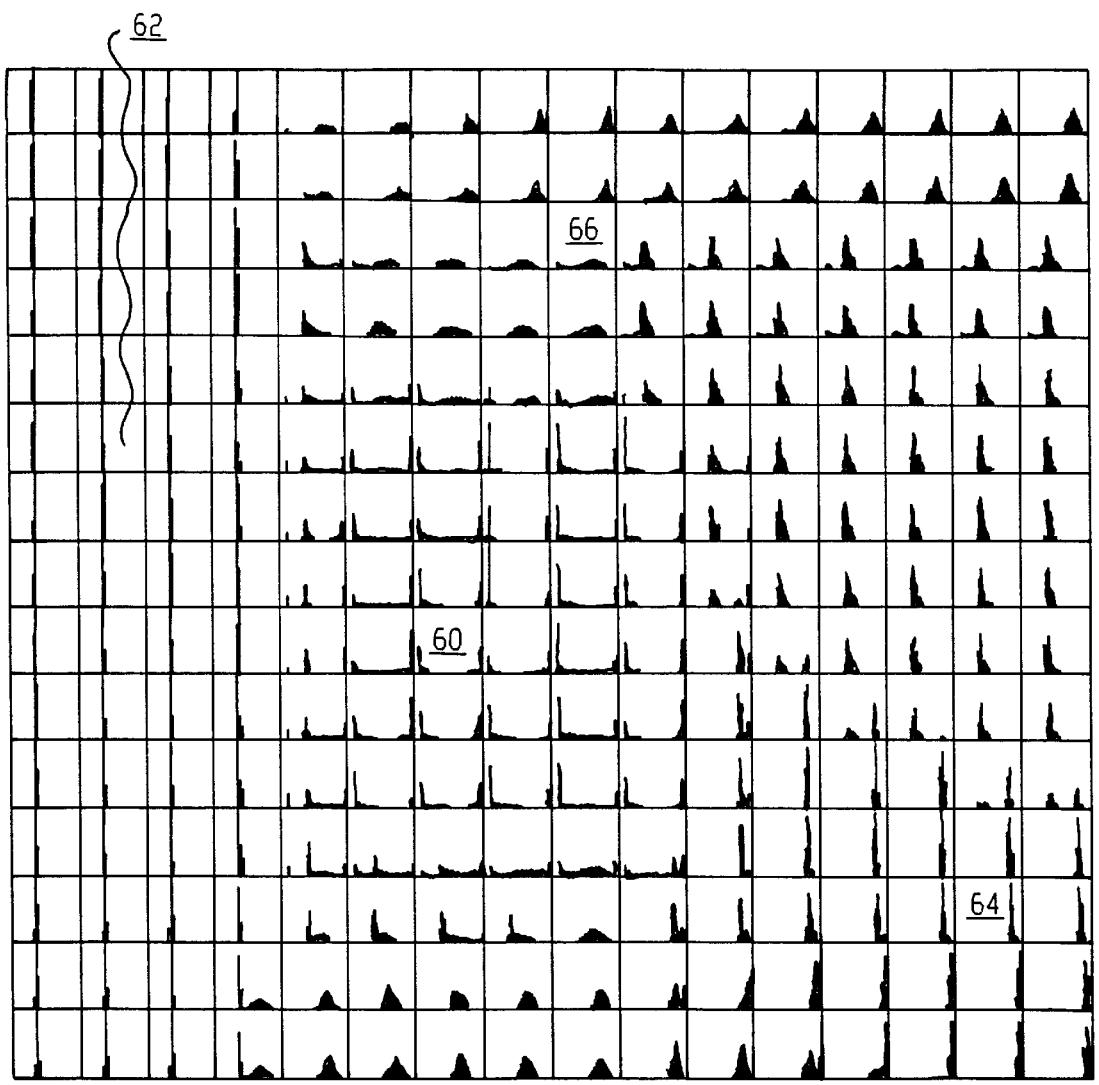
FIG. 6 shows histogram type data for window sections of the FIG. 5 image area.

Alternatively, an entire horizontal row of 16 window sections in FIG. 5 can be scanned to update the associated 16 histograms when scanning of these window sections is completed.

SIGNATURE HISTOGRAMS

With an understanding of the foregoing, the present inventor has discovered that a variety of different types of dataforms may be represented by characteristic histograms provided pursuant to the invention. Further, in accordance with the invention, such characteristic histograms may be used as "signature" histograms capable of identifying the particular type of dataform present in an image area.

Figure 8:
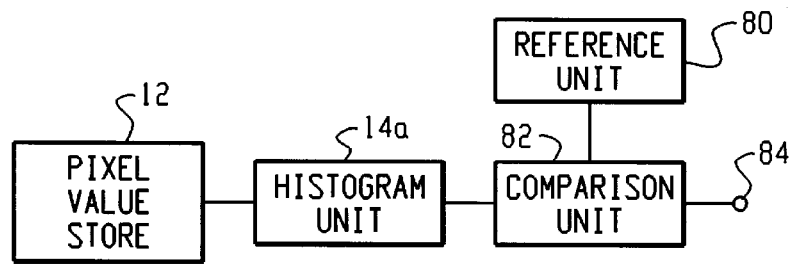
FIG. 8 is a block diagram of a system for identifying dataforms in accordance with the invention.
Figure 11:
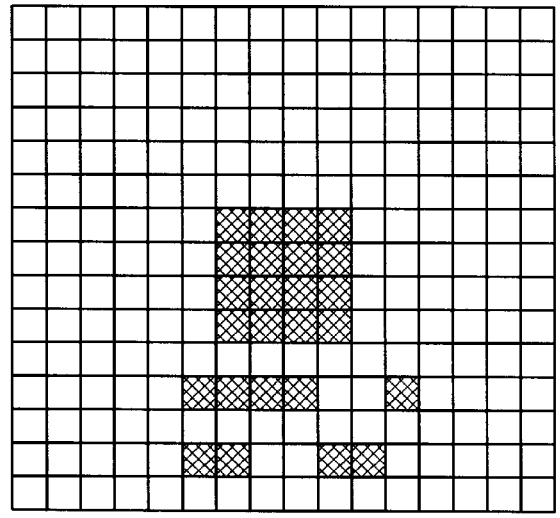
FIG. 11 shows a visual form of categorization of the FIG. 10 window sections.
Figure 9:
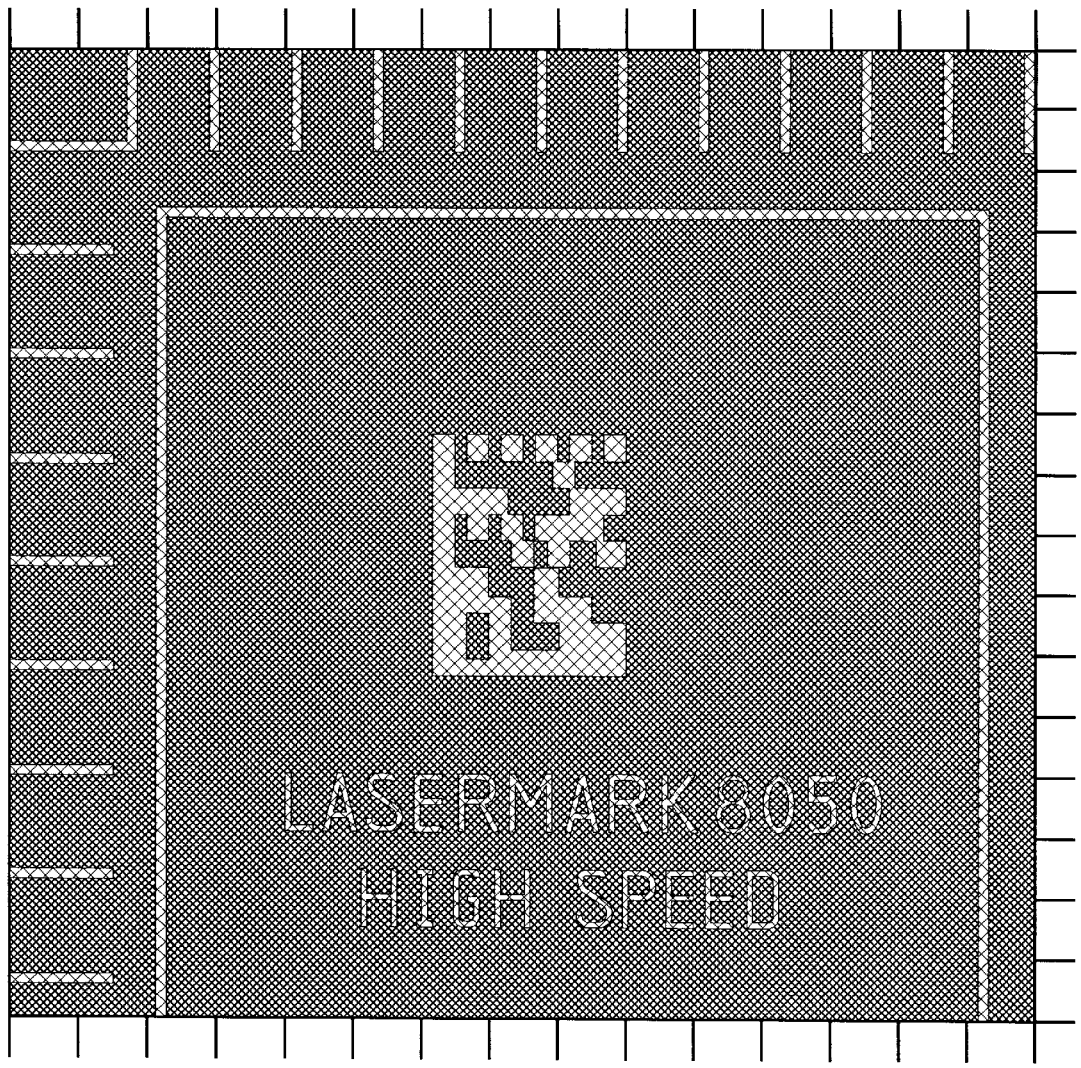
FIG. 9 is a second example of an image area including a dataform.
Figure 10:
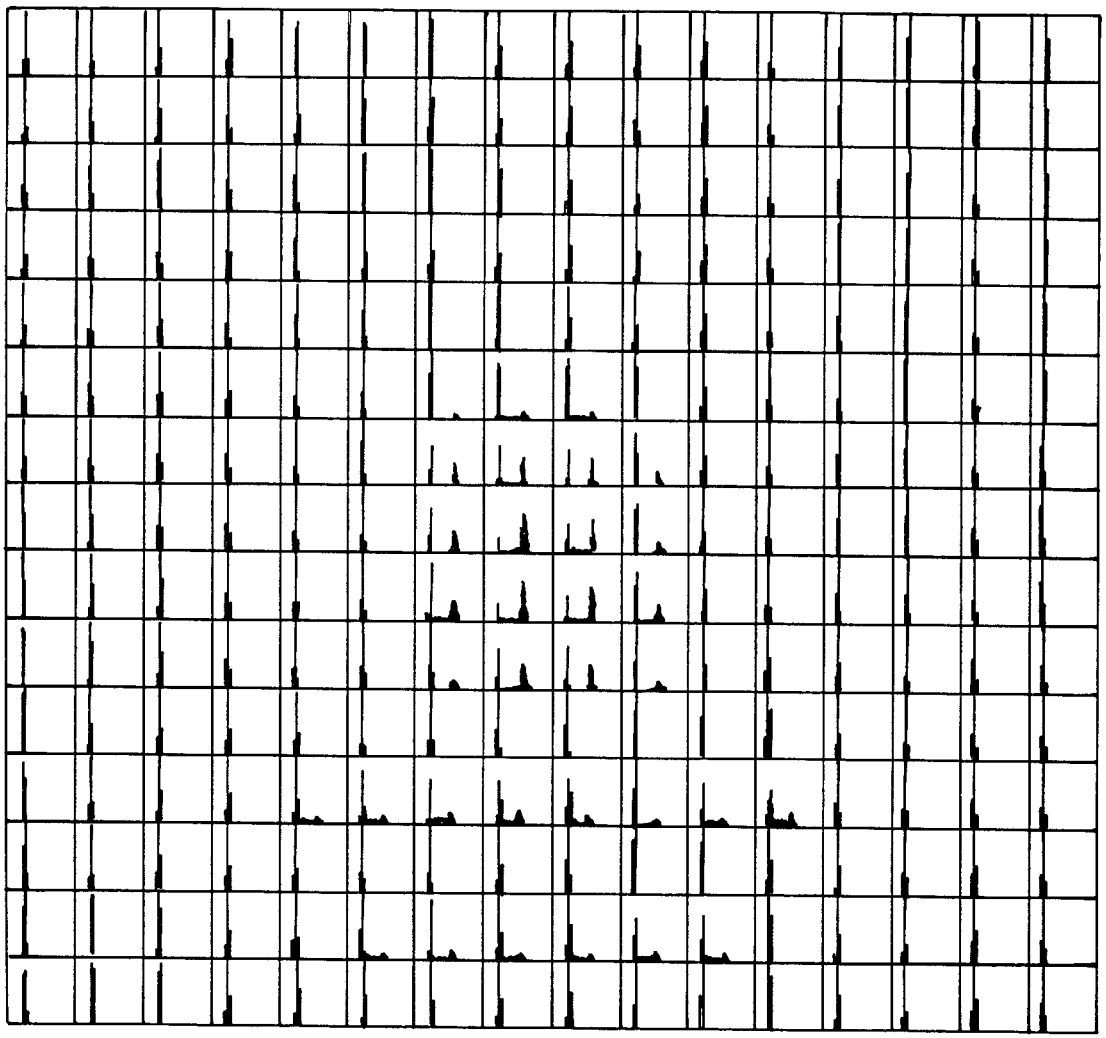
FIG. 10 shows histogram type data for window sections of the FIG. 9 image area.

With reference to FIG. 8, there is shown a block diagram of a system for recognizing a dataform for the purpose of identifying the type of dataform which is present. As illustrated, The FIG. 8 system includes a pixel value store unit 12, as in FIG. 3, and a histogram unit 14a generally corresponding to unit 14 of FIG. 3. More particularly, unit 14a is arranged to sample pixel values, each representative of a reflective value of an incremental part of an image area including at least a portion of a dataform (i.e., an unknown type of dataform), and to derive data indicative of relative levels of occurrence of pixel values representative of different reflective values (e.g., histogram type data). Reference unit 80 is arranged to provide reference data representative of one or more types of dataforms. Such reference data can be provided by advance derivation and storage of derived data representative of dataforms such as bar codes and matrix codes, which can be prepared as histogram type data in accordance with the invention and stored as reference data for comparison purposes. For purposes of illustration, FIG. 9 shows a second example of an image area including a dataform, in this case a matrix code with light colored elements and dark spaces on a dark background. FIG. 10 corresponds to FIG. 6 in showing 240 histograms each positioned in a square corresponding to a window section of the FIG. 9 image area. Comparing the histograms in the central area of FIG. 10 (which represent the FIG. 9 dataform) with the histograms in the central area of FIG. 6 (which represent the FIG. 5 dataform) certain distinguishing features are apparent. Thus, each group of central area histograms exhibits characteristic two color/two peak format, however the two peaks in FIG. 6 are more widely spaced than the differently spaced dual peaks in FIG. 10 resulting from different coloration. FIG. 11 shows a visual data form location representation corresponding to FIG. 7 (these representations are not useful for dataform signature identification purposes). Thus, it will be appreciated that central area histogram data from one or both of FIGS. 6 and 10 can be stored for use as reference data.

The FIG. 8 system also includes a comparison unit 82 arranged to compare the derived data for the "unknown" dataform of current interest to reference data previously stored in reference unit 80. Such comparison determines correspondence between the derived data and the reference data based upon the characteristic histogram type signatures representative of different types of dataforms, as discussed above. When the derived data corresponds to the reference data previously stored for a specific type of dataform, using appropriate comparison criteria, such correspondence is effective to identify the "unknown" dataform as being of the same type as such specific type of dataform represented by the stored reference data. In FIG. 8, an output device shown in the form of output terminal 84 is arranged to make available an output indication of correspondence between the current derived data and the stored reference data. When an identification is established by the comparison, the output indication can include identification of the specific type of dataform at hand.

The foregoing data comparisons take advantage of the histogram type characteristics of different types of dataforms as represented by the number of principal reflective values characterizing a particular type of dataform (number of histogram peaks), the spacing of principal reflective values (spacing of histogram peaks), the relative levels of occurrence of particular reflective values (height of histogram peaks), etc., and combinations thereof. Thus, by suitable analysis of the histogram type derived data for a specific type of dataform, characteristics suitable for identifying one type of dataform as differentiated from other types of dataforms is made possible on the basis of comparison of the histogram type signatures of each dataform type.

In accordance with the previous discussion of the invention, this output indication can be used for a variety of purposes in the field of dataform recognition, identification and decoding, with particular applicability to control of automated dataform reading systems. It will also be appreciated that methods and systems arranged to identify types of dataforms may readily be combined with arrangements for recognizing one or more of the presence, relative background area coloration and location of dataforms in accordance with the invention, as previously described.

While there have been described the currently preferred embodiments of the invention, those skilled in the art will recognize that other and further modifications may be made without departing from the invention and it is intended to claim all modifications and variations as fall within the scope of the invention.

What is claimed is:

1. A method of recognizing, in an image area, a transition between: (i) a first pattern characterized by X colors, where X is greater than 1 and (ii) a second pattern characterized by Y colors, where Y may be 1, and X and Y are different integer values, comprising the steps of:

(a) sampling pixel values, each representative of a reflective value of an incremental part of a window section of said image area, for a plurality of window sections including at least one window section overlying a portion of said first pattern, and one window section overlying a portion of said second pattern, to determine the number of occurences of each pixel value representative of the presence of different colors within each said window section;

(b) categorizing each said window section in one of the following groups: (i) a first group for which said derived data indicates the presence of X principal colors, (ii) a second group for which said derived data indicates the presence of Y principal colors, and (iii) a third group for other window sections; and (c) utilizing the composite positions of window sections of at least one of said groups of window sections to determine a transition between said first pattern, represented by said first group, and said second pattern, represented by said second group.

2. A method as in claim 1, wherein Y equals 1 and said second pattern is a background area of primarily a single color.

3. A method of recognizing, in an image area, a transition between: (i) a dataform including elements and spaces characterized by X colors, where X is greater than, and (ii) a background area characterized by Y colors, where Y may be 1, and X and Y are different integer values, comprising the steps of:

(a) determining, by use of pixel values each representative of a reflective value within a section of said image area, the number of occurences of each pixel value representing the presence of different reflective values within said section;

(b) categorizing said section in one of the following groups: (i) a first group characterized by the presence of X principal reflective values, (ii) a second group characterized by the presence of Y principal reflective values, and (iii) a third group for other image sections;

(c) repeating step (b) for at least one additional section of said image area, based on pixel values representative of reflective values within each respective section; and (d) utilizing positions within said image area of sections of at least one of said first and second groups to determine a transition between said dataform and said background area.

4. A method as in claim 3, wherein step (a) includes deriving a form of histogram data indicative of relative levels of occurrence of pixel values representative of different colors within particular sections of said image area.

5. A method as in claim 3, wherein step (a) includes deriving a form of histogram data indicative of the number of occurences of each pixel value representative of different colors within particular sections of said image area.

6. A method of recognizing a dataform comprised of elements and spaces of at least two different colors, present in an image area including a background area of primarily a single color, comprising the steps of:

(a) determining, by use of pixel values each representative of a reflective value within a section of said image area, the number of occurences of each pixel value representing different reflective values within said section;

(b) categorizing said section in one of the following groups: (i) a first group characterized by the presence of at least two principal reflective values and (ii) a second group characterized by the presence of one principal reflective value;

(c) repeating step (b) for at least one additional section of said image area, based on pixel values representative of reflective values within each respective section; and (d) utilizing at least one of said first and second groups of sections for identifying at least one characteristic of the image area.

7. A method according to claim 6, wherein the step of identifying at least one characteristic of the image area includes at least one of the following steps:

(1) determining a transition between sections of said first group and sections of said second group;

(2) recognizing the presence of said dataform;

(3) recognizing the type of dataform present; and (4) determining the location of said dataform.

* * * * *